US011099582B2

(12) United States Patent
Hardt et al.

(10) Patent No.: US 11,099,582 B2
(45) Date of Patent: Aug. 24, 2021

(54) NAVIGATION AIDS FOR UNMANNED AERIAL SYSTEMS IN A GPS-DENIED ENVIRONMENT

(71) Applicant: The Boeing Company, Chicago, IL (US)

(72) Inventors: Michael W. Hardt, Madrid (ES); Eduardo Gallo, Madrid (ES); Francisco A. Navarro, Madrid (ES); Glenn Scott Bushnell, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/707,813

(22) Filed: Dec. 9, 2019

(65) Prior Publication Data

US 2020/0149891 A1 May 14, 2020

Related U.S. Application Data

(62) Division of application No. 15/592,001, filed on May 10, 2017, now Pat. No. 10,648,814.

(30) Foreign Application Priority Data

Jul. 5, 2016 (EP) .................................. 16382318

(51) Int. Cl.
*G05D 1/10* (2006.01)
*B64C 19/00* (2006.01)
(Continued)

(52) U.S. Cl.
CPC ............ *G05D 1/101* (2013.01); *B64C 19/00* (2013.01); *G01C 21/00* (2013.01); *G01C 21/16* (2013.01); *G01C 21/165* (2013.01); *G01C 23/00* (2013.01)

(58) Field of Classification Search
CPC ...... B64C 19/00; G01C 21/00; G01C 21/165; G01C 23/00; G01C 21/16; G01C 21/14; G05D 1/101
See application file for complete search history.

(56) References Cited

U.S. PATENT DOCUMENTS 7,289,906 B2 * 10/2007 van der Merwe ... G01C 21/165
342/357.65
9,031,782 B1 * 5/2015 Lemay .................. G01C 21/00
701/445

(Continued)

FOREIGN PATENT DOCUMENTS

EP 2667273 11/2013
GB 2504376 1/2014

OTHER PUBLICATIONS

European Patent Office, "Communication pursuant to Article 94(3) EPC," issued in connection with European Patent Application No. 16 382 318.0, dated Feb. 3, 2017, 6 pages.

(Continued)

*Primary Examiner* — Ramsey Refai
(74) *Attorney, Agent, or Firm* — Hanley, Flight & Zimmerman, LLC

(57) ABSTRACT

Example navigation aids for increasing the accuracy of a navigation system are disclosed herein. An example method disclosed herein identifying, with an aircraft intent description language (AIDL) aid, an AIDL instruction as associated with a first dynamic activity level of a plurality of dynamic activity levels and determining, with the AIDL aid, an aircraft state to be affected by the AIDL instruction. The example method also includes changing, with a navigation filter, a weighting scheme for a measurement of the aircraft state obtained by an inertial navigation system (INS) of the aircraft and estimating, with the navigation filter, a trajectory (Continued)

of the aircraft based on the weighting scheme and the measurement.

20 Claims, 5 Drawing Sheets

(51) Int. Cl.
 *G01C 21/00* (2006.01)
 *G01C 21/16* (2006.01)
 *G01C 23/00* (2006.01)

(56) References Cited

U.S. PATENT DOCUMENTS

| | | |
|---|---|---|
| 2009/0322598 A1 | 12/2009 | Fly et al. |
| 2011/0307173 A1 | 12/2011 | Riley |
| 2015/0203213 A1* | 7/2015 | Levien .................. G01C 21/00 701/486 |
| 2016/0047675 A1* | 2/2016 | Tanenhaus ........... G01C 25/005 702/104 |

OTHER PUBLICATIONS

European Patent Office, "Communication Pursuant to Article 94(3) EPC," issued in connection with European Patent Application No. 16 382 318.0, dated Mar. 9, 2018, 6 pages.

Yepes et al., "New Algorithms for Aircraft Intent Inference and Trajectory Prediction," Journal of Guidance, Control and Dynamics, vol. 30, No. 2, Mar.-Apr. 2007, 13 pages.

United States Patent and Trademark Office, "Restriction", issued in connection with U.S. Appl. No. 15/592,001, dated Feb. 5, 2019, 7 pages.

United States Patent and Trademark Office, "Non-Final Office Action", issued in connection with U.S. Appl. No. 15/592,001, dated May 2, 2019, 9 pages.

United States Patent and Trademark Office, "Notice of Allowance and Fee(s) Due", issued in connection with U.S. Appl. No. 15/592,001, dated Sep. 27, 2019, 8 pages.

* cited by examiner

NAVIGATION AIDS FOR UNMANNED AERIAL SYSTEMS IN A GPS-DENIED ENVIRONMENT

RELATED APPLICATION

This patent arises from a divisional of U.S. application Ser. No. 15/592,001, titled "Navigation Aids for Unmanned Aerial Systems in a GPS-Denied Environment," filed May 10, 2017, which claims priority to European Patent Application No. 16382318.0, titled "Navigation Aids for Unmanned Aerial Systems in a GPS-Denied Environment," filed Jul. 5, 2016, both of which are hereby incorporated by reference in their entireties.

FIELD OF THE DISCLOSURE

This disclosure relates generally to navigation aids and, more particularly, to navigation aids for unmanned aerial systems in a GPS-denied environment.

BACKGROUND

Unmanned aerial systems (UAS) employ a navigation system to determine a position or trajectory of an aircraft, such as an unmanned aerial vehicle (UAV). The navigation system uses a navigation model that combines measurements from an inertial navigation system (INS) of the UAV and absolute reference information from a global position system (GPS) to monitor the trajectory of the UAV. However, in some instances, GPS signals are not available or insufficient to obtain reliable data. In such an instance, the navigation system reverts to using a dead reckoning navigation technique, which relies solely on the measurements from the INS. However, measurements from the sensors of the INS are often noisy and introduce error into the navigation model. This error quickly propagates and causes the actual trajectory of the UAV to diverge from the estimated trajectory.

SUMMARY

Example navigation aids are disclosed herein. An example method disclosed herein includes identifying, with an aircraft intent description language (AIDL) aid, an AIDL instruction as associated with a first dynamic activity level of a plurality of dynamic activity levels and determining, with the AIDL aid, an aircraft state to be affected by the AIDL instruction. The example method also includes changing, with a navigation filter, a weighting scheme for a measurement of the aircraft state obtained by an inertial navigation system (INS) of the aircraft and estimating, with the navigation filter, a trajectory of the aircraft based on the weighting scheme and the measurement.

An example aircraft disclosed herein includes an inertial navigation system (INS) to obtain a measurement of an aircraft state, an aircraft intent description language (AIDL) aid to identify an AIDL instruction of an aircraft as associated with a dynamic activity level, the aircraft state affected by the AIDL instruction, and a navigation filter to change a weighting scheme for the measurement of the aircraft state and estimate a location of the aircraft based on the weighting scheme and the measurement.

An example tangible computer readable storage medium includes instructions that, when executed, cause a machine to at least identify an AIDL instruction as associated with a high dynamic activity, determine an aircraft state to be affected by the AIDL instruction, change a weighting scheme for a measurement of the aircraft state obtained by an inertial navigation system (INS) of the aircraft, and estimate a trajectory of the aircraft based on the weighting scheme and the measurement.

Figure 1:
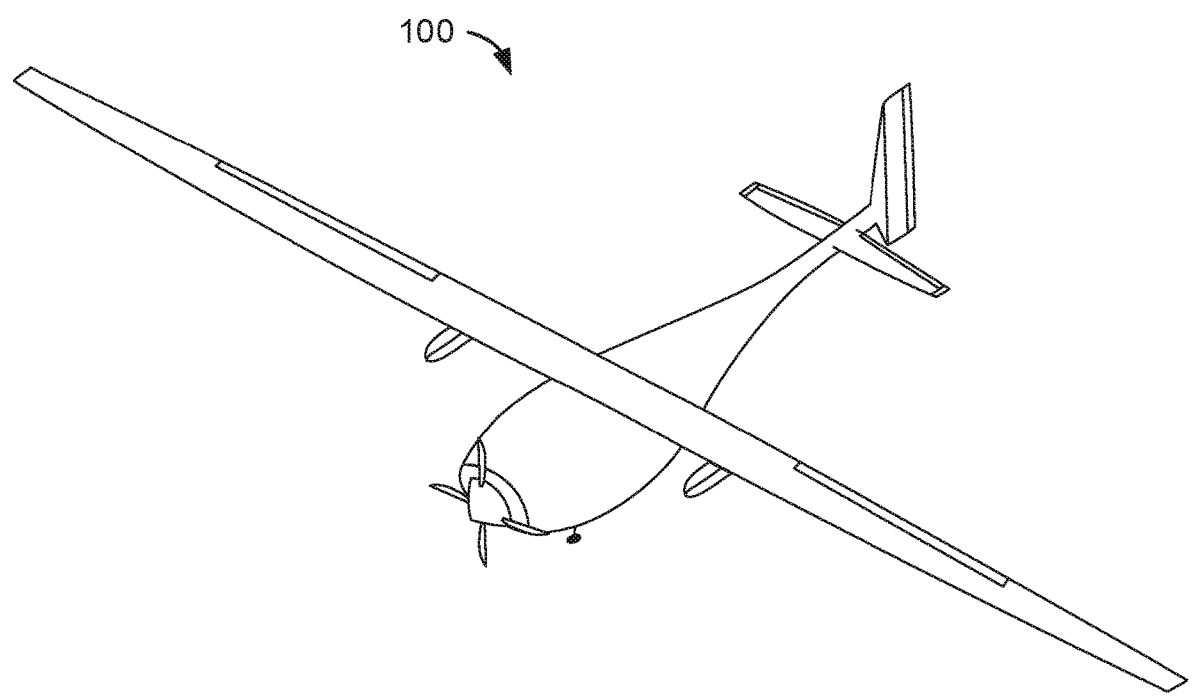
FIG. 1 illustrates an example unmanned aerial vehicle (UAV) in which the example systems and methods disclosed herein may be implemented.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Disclosed herein are example methods, apparatus/systems and articles of manufacture for increasing the accuracy of a UAS navigation system in a GPS-denied environment. As used herein, the terms GPS and Global Navigation Satellite System (GNSS) may be used interchangeably and include any satellite system(s) or combination thereof for determining position (e.g., NAVSTAR, Gallileo, Baidou, Globalnaya Navigazionnaya Sputnikovaya Sistema (GLONASS), etc.). In general, example navigation systems disclosed herein employ an aircraft intent description language (AIDL) aid to identify aircraft states in which relatively higher noise or variability is expected due to the signals obtained by the sensors of the INS and the maneuvers being performed. This information is used by a navigation filter to modify a weighting scheme in a process model of the navigation filter. As a result, less error is introduced into the process model, thereby increasing the accuracy of the aircraft position or trajectory estimation when no absolute position or velocity reference (e.g., GPS signal) is available.

Before turning to the detailed aspects of the disclosed navigation aids, a brief description of conventional navigation techniques is provided. In general, UAVs are capable of operating autonomously, i.e., without direct communication with a ground based operator. The UAV follows a preloaded set of instructions intended to execute a mission and return to base without external intervention. The navigation capabilities of these UAVs are fundamental for their success and survivability. When operating in a semi-autonomous or autonomous fashion, the UAV on its own must optimally combine the sensor information it has available to achieve a best estimate of its current position and configuration (e.g., pitch, yaw, etc.).

In general, most known navigation techniques are based on two fundamental methods: position fixing and dead reckoning. UAVs often utilize a combination of both. Position fixing relies on devices measuring physical properties external to the aircraft, such as the distance to given points (or satellites) (e.g., the Global Navigation Satellite System (GNSS)), the position of the Sun or the stars, the Earth's magnetic field, atmospheric properties, the incoming airspeed velocity and orientation, the location of the horizon, the height over terrain, etc. Dead reckoning is the process of calculating a current position by using a previously determined position, or fix, and advancing that position based upon known or estimated accelerations and/or speeds over elapsed time and course. In other words, a dead reckoning position solution is the sum of a series of relative position measurements. Dead reckoning techniques are autonomous in the sense that they measure physical processes intrinsic to the aircraft, such as accelerations and angular speeds. In particular, an inertial navigation system (INS) of the aircraft uses linear and angular velocities and accelerations (from the sensor(s)) to estimate the position, orientation and/or velocity of the UAV. The INS may utilize one or more sensors, such as solid-state accelerometers, gyros, magnetometer, static/dynamic pressure sensors and/or any other inertial measurement units (IMUs) that take into consideration geometric and kinematic relationships. As each of these sensors is subject to error, the aggregated position solution error grows over time. On the other hand, position fixing does not suffer from error growth as it relies on components external to the aircraft. Another difference between the above-noted methods is that position fixing information may not be continuously available, while dead reckoning always provides a solution as long as the starting position is known. Thus, most UAVs include a navigation system that combines a dead reckoning system such as an INS with several position fixing devices or systems, including at least one GPS sensor.

The conventional navigation system in known UAS consists of an information fusion solution such as an Extended Kalman filter (EKF) that combines (e.g., fuses, blends, etc.) the absolute position, velocity and time (PVT) solution provided by a GPS sensor with a dead reckoning position provided by an INS. The EKF estimates the position (e.g., location, trajectory), velocity and angular orientation of the aircraft based on the combined data. In general, the INS provides the reference trajectory (determined by the sensors) while the GPS serves as an updating system. This is mainly due to the fact that the INS measurement frequency is much higher than the measurement frequency of GPS. In other words, the GPS measurements provide an external aid that resets the position and velocity estimates as determined from the measurements of the INS. The combined GPS/INS system works well as long as GPS provides a valid PVT solution because it limits the drift inherent to the accelerometers, the gyroscopes and other IMUs of the INS.

However, in some instances, a GPS signal is not obtainable or the GPS signal is relatively weak (e.g., insufficient), referred to herein as a GPS-denied or a GPS-stressed environment. A GPS-denied environment may be caused by a variety of factors such as the terrain, the weather, Radio Frequency Interference (RFI), intentional jamming (e.g., a spoofing attack, a malicious jammer, etc.), etc. If a UAV is far from its destination (e.g., a base) and enters a GPS-denied environment, the UAV may have to fly a considerable distance to reach an area in which GPS signals may again be processed in a reliable manner.

In known UAS GPS-denied environments, the remaining available onboard sensor information of the UAS does not allow the UAS to complete its assigned mission. Instead, the UAS mission is converted into one of survivability and programmed to return successfully to its base. At the moment the UAS detects it is in a GPS-denied environment, a typical strategy may be to use its current navigation estimate (e.g., an estimate of the current position or trajectory), which may still be considered to be fairly accurate, and plan (autonomously) a route to return to its base. In many instances, equipping a UAS with additional position fixing sensors (e.g., that measure the bearing of the sun, the stars, Earth's magnetic field, etc.) is often prohibitive due to size, weight and power (SWaP) constraints of the UAV. Therefore, without absolute position reference measurements, the navigation system enters into a dead reckoning mode, which inevitably accumulates errors. In the dead reckoning mode, the linear accelerations and velocities are integrated without measurement corrections (that would otherwise be provided by the GPS sensor), and a drift in the position estimate is thus inevitable due to cumulative errors. The sensors or IMUs suffer from errors from system noise, bias, scale factor, non-orthogonality, temperature, etc. These errors can be considerable and may vary widely depending upon the quality of the sensors, navigation algorithms and environmental conditions. Moreover, in known implementations of the EKF, attitude information also becomes corrupted, which makes the UAS unable to continue flying. In other words, when no absolute position or velocity reference is available for the navigation system, the estimation method reverts to simple integration of the current state based upon measured accelerations. Any velocity estimation error that is accumulated during flight when in this mode is propagated and integrated such that at best a linear position error divergence results. As these biases accumulate, the divergence grows until there is no longer a possibility that the UAV may recover, especially if its flight range and autonomy are limited, which is usually the case. By the time a UAV has reacquired a dependable GPS signal, the UAV drift may be so severe that the UAV has no chance of reaching its base due to its limited autonomy.

Disclosed herein are example methods, apparatus/systems and articles of manufacture that reduce the estimation errors and biases that are typically introduced into navigation estimates made in a GPS-denied environment. The disclosed methods, apparatus/systems and articles of manufacture can increase the survivability of an aircraft. In general, the example navigation systems disclosed herein include an aircraft intent description language (AIDL) aid that identifies the dynamic variability of the aircraft states. This information is used by the navigation filter to change a weighting scheme of the state measurements provided by the INS. Depending upon the current dynamic behavior of the aircraft, certain aircraft sensors or internal models are more effective than others for reconstructing the aircraft state. The navigation filter reacts and changes the weighting scheme of the state measurements for the affected states. Thus, the example AIDL aid characterizes the variability expected in certain states, which is then used by the navigation filter to adaptively or dynamically adjust the filter structure (e.g., the process model). For example, if a certain state is expected to experience high noise or variability in the measurements from the associated sensors, the navigation filter modifies the weight of the sensor measurements in the trajectory estimation. In some examples, the sensor measurements are given less weight and/or the predicted state measurements are given more weight. If the navigation filter is an EKF, for instance, the process and measurement noise covariances of the state can be increased or decreased.

As an example implementation, consider that the indicated dynamic behavior is to realize a constant turn beginning with a ramp-up in angular velocity, then maintain the angular velocity at a constant value, then a ramp-down in angular velocity to a straight flight. During flight, winds, in particular turbulence, are responsible for producing unsteady flight. In UAVs, for example, which are relatively light aircraft, it is not uncommon that winds plus turbulence reach 50% of the commanded velocities. When these effects are summed into the dynamics, the inertial sensor information may be very noisy with large transient effects that distort the accuracy of the measurements. Nevertheless, an underlying dynamic profile is present describing the commanded changes in the aircraft attitude and angular velocity accompanied by control efforts to maintain a coordinated turn while maintaining lift. The knowledge of this profile serves to immediately weight more the internal dynamic model in the state reconstruction process, all in the absence of absolute position and reference data and direct measurements of external influences such as wind information. The example techniques reduce the drift in the dead reckoning process. As such, the example navigation systems achieve a smoother and improved (i.e., more accurate) estimation of the aircraft position, velocity and orientation in the presence of many underlying noisy information processes.

Turning now to the figures, FIG. 1 illustrates an example UAV 100 (e.g., an aircraft) that may implement the example navigation systems and methods disclosed herein. In the illustrated example, the UAV 100 is a fixed-wing aircraft. However, in other examples, the UAV 100 may be other types of aircraft (e.g., a rotary aircraft).

Figure 2:
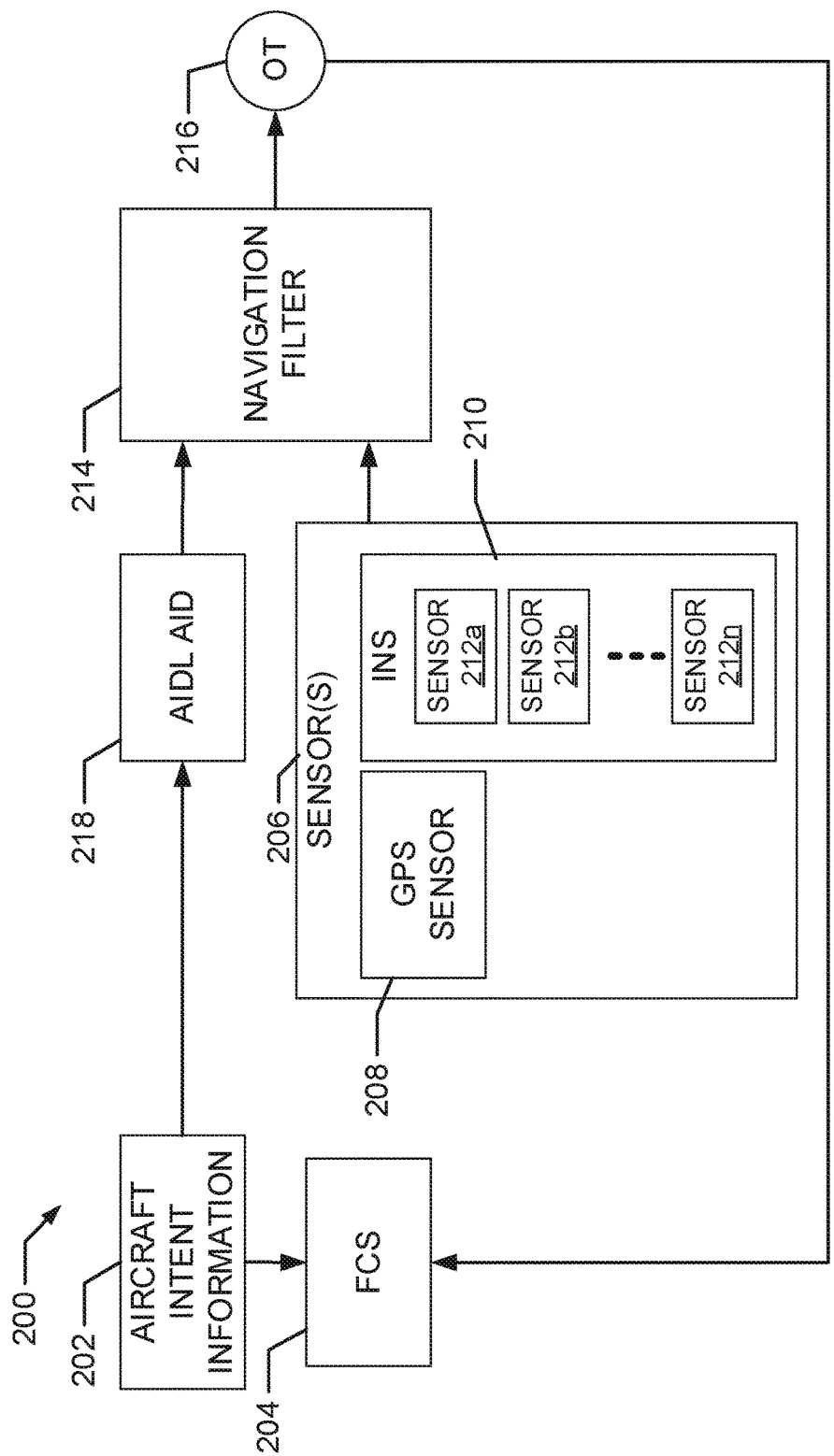
FIG. 2 is an example navigation system for the example UAV of FIG. 1 constructed in accordance with the teachings of this disclosure.

FIG. 2 illustrates an example navigation system 200 implemented by the UAV 100 (FIG. 1). The navigation system 200 includes aircraft intent information 202 (e.g., guidance information) stored as aircraft intent description language (AIDL) instructions. The aircraft intent information 202 models the way the UAV 100 is to be operated during flight. In general, aircraft intent represents an abstraction of the way in which an aircraft is instructed to behave by a flight deck (e.g., by a pilot). In the same way that an aircraft exhibits a unique trajectory as a result of the flight deck input (e.g., from pilot commands and subject to current environmental conditions such as wind), the aircraft intent is formulated in such a way that the ensuing aircraft motion is unambiguously determined given the current environmental conditions, resulting in a unique computed trajectory. AIDL is a formal language that expresses the aircraft intent in a standardized manner. The syntax of the formal language provides a framework that allows instructions to be combined into sentences that describe operations. Each operation contains a complete set of instructions that closes the three degrees of freedom in the equations of motion of a simplified flight model, which is additionally combined with further flight assumptions such as symmetric flight to close the remaining degrees of freedom and unambiguously define the aircraft trajectory over its operation interval. Instructions may be thought of as indivisible pieces of information that capture basic commands, guidance modes and control inputs at the disposal of a pilot and/or a flight management system.

The aircraft intent information 202 (in the AIDL format) is delivered to a Flight Control System (FCS) 204 (e.g., a flight management system) to be implemented thereby. In general, the AIDL instructions of the aircraft intent information 202 include three algebraic constraints that are imposed upon the FCS 204. There exists a wide class of different algebraic constraints from which the aircraft intent design may be selected. Each of these algebraic constraints and their combination may be associated with a given desired dynamic system behavior that is subsequently implemented by the FCS 204. The FCS 204 calculates the commands to be sent to the actuator(s) (e.g., an aileron actuator, an elevator actuator, etc.) to fulfill the guidance commands. In parallel, the AIDL information is sent to an AIDL aid 218, described in further detail herein.

In the illustrated example, the navigation system 200 includes one or more sensors 206. The sensor(s) 206 include the active or passive, internal or external sensor(s) of the UAV 100 that measure the flight dynamics. The sensor(s) 206 may include any position fixing sensor(s) and/or inertial sensor(s). In the illustrated example, the sensor(s) 206 include a GPS sensor 208 for detecting an absolute position of the UAV 100. The sensor(s) 206 also include an inertial navigation system (INS) 210 that measures or detects changes in position, velocity, etc. The INS 210 obtains measurements from one or more sensors $212a$-$212n$ (e.g., an inertial measurement unit (IMU)). The sensor(s) $212a$-$212n$ may include, for example, an accelerometer, a gyroscope, a magnetometer, a static pressure sensor (e.g., an altimeter or barometer), a dynamic pressure sensor, a temperature sensor, etc. In some examples, the navigation system 200 is implemented as a simulation model. In such an example, a 6-DOF Flight Dynamics Model (FDM) may be used to model the predicted flight dynamics, which is then fed into to the sensor(s) 206. For example, the FCS 204 may provide the intended actuator instruction to the 6-DOF FDM that models the aircraft behavior, which is then detected by the sensor(s) 206.

In the illustrated example, the navigation system 200 includes a navigation filter 214 that attempts to determine (e.g., estimate, predict) the state of the UAV 100 and outputs an observed trajectory (OT) 216. In general, in a 6-DOF model, an aircraft can be defined by twelve states: the linear position in the X, Y and Z components; the linear velocity in the X, Y and Z components; the angular configuration (yaw, pitch and roll); and the angular velocity (rotational rate in the yaw, pitch and roll). Based on these twelve states, the position, the velocity and the orientation of the UAV 100 can be determined. When GPS signals are available, the navigation filter 214 fuses the measurement(s) from the INS 210 (as provided by the sensor(s) $212a$-$212n$) with an absolute position measurement (e.g., position, velocity, time, etc.) from the GPS sensor 208 to determine the OT 216. The OT 216 is fed back to the FCS 204, which continues to monitor and construct the flight control commands based on the OT 216 and the guidance information from the aircraft intent information 202. However, the signals produced by the sensors $212a$-$212n$ contain error in the form of noise, bias, etc. Therefore, when GPS signals are available, the navigation filter 214 uses the absolute position measurements from the GPS sensor 208 as a check to confirm the accuracy of the position estimate determined from the INS 210. The navigation filter 214 combines the measurements from the INS 210 and the absolute PVT measurements from the GPS sensor 208 to predict the position, velocity and orientation of the UAV 100 and, thus, the OT 216.

However, in some situations, absolute PVT measurements cannot be obtained, such as when the UAV 100 is in a GPS-denied environment. Without absolute PVT measurements, the navigation system 200 uses the dead reckoning technique to reconstruct the aircraft state and predict the OT 216. In other words, the navigation filter 214 is tasked with reconstructing the aircraft state based on an incomplete set of input sensorial data. In such an instance, the INS 210 provides measurements to the navigation filter 214, which are used to predict the trajectory of the UAV 100. However, the noise and other error in the signal(s) or measurement(s) from the INS 210 introduces error into the process model, which affects the OT 216. In addition, especially during a highly dynamic state, the error in certain state measurements increases. As a result, error is introduced into the OT 216, which quickly compounds. Within a relatively short period of time, the OT 216 is significantly different than the actual trajectory of the UAV 100.

To increase the accuracy of the OT 216, the example navigation system 200 includes an AIDL aid 218 (e.g., an AIDL processor). As mentioned above, the aircraft intent information 202 (represented by AIDL instructions) includes information about the guidance settings and maneuvers to be employed by the UAV 100 to fulfill its intended mission. This information represents the dynamic profile of a flight maneuver being executed by the FCS 204. Using the dynamic profile, the AIDL aid 218 identifies different levels and nature of variability within the aircraft states depending upon the executed maneuver. Based on the different levels and variability, the navigation filter 214 changes the weighting scheme of the aircraft state measurements obtained by the INS 210, thereby improving the predictions and reducing error in the OT 216.

Then, the weighting scheme for the process noise associated with the affected state(s) in the navigation filter 214 can be changed. Therefore, more or less weight is placed on the affected state(s). As such, if the state is expected to experience more variability (e.g., more noise), less weight can be placed on the state measurements from the INS, thereby decreasing the error that would otherwise be induced by the noisy, unreliable signals. As a result, the example process avoids tracking states that have a lot of variability (e.g., error) and which would otherwise corrupt of the states that have reliable values.

Figure 3:
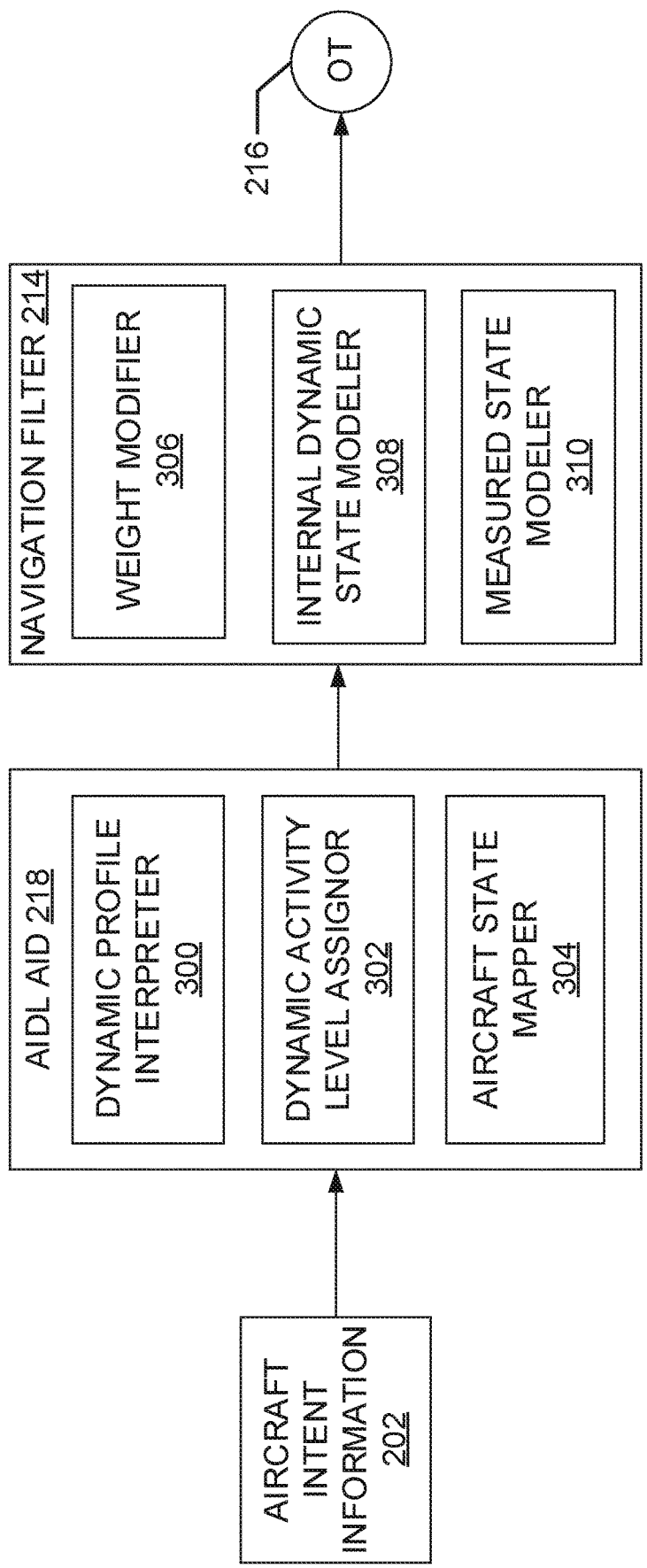
FIG. 3 illustrates an example aircraft intent description language (AIDL) aid and example navigation filter implemented by the example navigation system of FIG. 2.

As illustrated in the example of FIG. 3, the AIDL aid 218 includes a dynamic profile interpreter 300 that identifies a dynamic profile (e.g., a trajectory class) of the UAV 100 based on the AIDL instructions. In other words, the dynamic profile interpreter 300 determines the range of expected aircraft state velocities and accelerations and expected measurements.

The aircraft intent information 202 provides AIDL guidance information for three complementary threads of dynamic behavior: (1) longitudinal (e.g., pitch); (2) lateral (e.g., yaw); and (3) propulsive motion. The three threads are the three degrees of freedom that are specified for the AIDL. Longitudinal behavior describes the motion upward or downward, for example, when the UAV 100 pitches up or down. Lateral behavior describes the motion from side-to-side, (e.g., left to right), for example, yaw. Propulsive motion is the propulsive force provided by engines or other propulsive motion devices of the UAV 100. For any maneuver, the AIDL guidance information includes at least one active AIDL instruction for each thread of dynamic behavior that indicates how the motion in the respective thread is to be constrained.

The AIDL aid 218 includes a dynamic activity level assignor 302 that categorizes each behavioral thread and the corresponding instruction(s) into two or more dynamic activity levels (e.g., dynamic states), which indicate the level or degree of variability to be expected. For example, the dynamic activity level assignor 302 may categorize a behavioral thread or instruction into two dynamic activity levels: a first dynamic activity level and a second dynamic activity level. The first dynamic activity level may be, for example, a high dynamic activity level (or high dynamic activity) where the velocities or accelerations are going to be higher than normal (e.g., when significant changes are expected to occur in certain states). The second dynamic activity level may be, for example, a low or normal dynamic activity level where little or no variability is expected.

For example, Table 1 illustrates three example maneuver trajectories T1, T2 and T3 and the applicable AIDL instructions for the three threads of the dynamic behavior for each of the trajectories T1, T2 and T3. In the illustrated example, T1 represents a longitudinal maneuver trajectory, T2 represents a lateral maneuver trajectory, and T3 represents a lateral and longitudinal maneuver trajectory.

TABLE 1

| Trajectory | Propulsive | Longitudinal | Lateral |
|---|---|---|---|
| T1: Longitudinal Maneuver Trajectory | HS | VSL/HVS | HC |
| T2: Lateral Maneuver Trajectory | HS | HA | CL/HC |
| T3: Lateral and Longitudinal Maneuver Trajectory | HS | VSL/HVS | CL/HC |

The example AIDL instructions have the following definitions:
  HS: Hold Speed (Propulsive Profile)
  HA: Hold Altitude (Longitudinal Profile)
  VSL: Vertical Speed Law (Longitudinal Profile)
  HVS: Hold Vertical Speed (Longitudinal Profile)
  HC: Hold Course (Lateral Profile)
  CL: Course Law (Lateral Profile)

Therefore, for T1, the AIDL instruction for the propulsive thread of dynamic behavior is a Hold Speed command, the AIDL instruction for the longitudinal thread of dynamic behavior is a Vertical Speed Law command or a Hold Vertical Speed command, and the AIDL instruction for the lateral thread of dynamic behavior is a Hold Course command. The dynamic activity level assignor 302 categorizes or divides a dynamic activity into a plurality of dynamic activity levels and then assigns each behavioral thread and its instruction(s) to the corresponding level. For example, depending on the level of activity (e.g., the amount of change) to occur in the longitudinal behavior, the longitudinal thread and the corresponding instruction are categorized as a first (high) dynamic activity level or a second (low) dynamic activity level. For instance, an instruction that commands a 15° pitch increase for the longitudinal motion thread may be assigned to the first (high) dynamic activity level, whereas an instruction that commands a 2° pitch increase may be assigned to the second (low) dynamic activity level. In some examples, the dynamic activity level assignor 302 compares the AIDL instruction and/or the associated maneuver to a threshold to determine whether the dynamic state is in the first (high) or second (low) dynamic activity level. For example, if the AIDL instruction or maneuver is associated with 10° or higher change in pitch, then the dynamic activity level assignor determines the AIDL instruction is a high dynamic activity level. In other examples, more or fewer categories or levels may be defined (e.g., a medium dynamic activity level, medium-low dynamic activity level, medium-high dynamic activity level, etc.).

In the illustrated example, the AIDL aid 218 includes an aircraft state mapper 304 that identifies or maps the state(s) or state vector(s) that are affected by each thread of dynamic behavior and the corresponding instruction. For example, Table 2 illustrates an example mapping between the state(s) or state vector element(s) most directly affected by a change in variability of the AIDL instruction(s) with the reference trajectories T1, T2 and T3.

TABLE 2

| Active Instruction(s) | State Vector Element(s) |
| --- | --- |
| HA | Altitude |
| CL/HC | Horizontal Position Vector, Horizontal Speed Vector, Yaw Angle |
| VSL/HVS | Altitude, Vertical Speed, Pitch Angle |

For example, in a VSL or HVS command, one of the states most affected by the AIDL instruction is the altitude. Therefore, when executing a VSL or HVS AIDL instruction that has been categorized as a first (high) dynamic activity level, the altitude is expected to experience high variability or noise in the measurements from the sensor measuring the state (e.g., an accelerometer). Additionally or alternatively, another state that may be most affected by a VSL or HVS command is the pitch angle. Therefore, when executing a first (high) dynamic activity level AIDL instruction for a pitch up maneuver (e.g., increasing the velocity in the Z or vertical direction and/or the pitch angle), one or more sensors associated with measuring the pitch angle are expected to experience more noise and/or variability (e.g., from wind) in the signal. In other examples, more or fewer states may be affected by an AIDL instruction. By mapping the AIDL instruction(s) to the state vector element(s), the AIDL aid 218 determines the aircraft state(s) to be affected by an AIDL instruction.

Once the state(s) for an AIDL instruction are identified, a weight modifier 306 changes the weight given to the measurements for the state(s) as measured by the sensor(s) of the INS 210. In other words, by identifying the state(s) that are going to be affected and, thus, more variable, less weight is placed on the measurements from the INS 210 of those states when reconstructing the state of the aircraft. For example, if the navigation filter 214 employs an EKF, the process or measurement noise covariances can be modified. As an example, when a state enters into the first (high) dynamic activity level as a result of the current AIDL instruction, the process noise covariance in Q corresponding to the affected aircraft state is divided by a factor of 10. As a result, the aircraft state as measured by the INS 210 is given less weight, due to the decrease in the covariance factor. Otherwise, when in the second (low) dynamic activity level, the same process noise covariance term is multiplied by a factor of 10. In other examples, more or fewer categories or levels may be defined, and different weighting factors may be assigned to each level. For example, the AIDL aid 218 may categorize the threads of dynamic behavior into a first (high), second (medium-high), third (medium-low), and fourth (low), wherein a first (high) dynamic activity level state is multiplied by a factor of 10, a second (medium-high) dynamic activity level state is multiplied by a factor of 5, a third (medium-low) dynamic activity level state is divided by a factor of 5, and a fourth (low) dynamic activity level state is divided by a factor of 10. In the illustrated example, the weight modifier 306 is implemented in the navigation filter 214. However, in other examples, the weight modifier 306 may be implemented by the AIDL aid 218.

Additionally or alternatively, the weight modifier 306 assigns more or less weight to the state as predicted by the internal dynamic model. For example, the EKF process is generally separated into a predictor process and an observer process, where the state is first propagated forward using state equations (i.e., the predicted state or the internal dynamic model), and then the observer equations follow second in which the predicted state is updated. In the illustrated example, the navigation filter 214 includes an internal dynamic state modeler 308 that predicts how the state is evolving with time (e.g., the internal dynamic model), and a measured state modeler 310 updates the predicated state with periodic measurements from the INS 210, which are received at different frequencies, to determine how the state is evolving over time. Instead of relying heavily on the measurements from the INS 210 during the observer process, the weight modifier 306 changes the weighting scheme to place more weight on the state measurements as propagated during the predictor process (e.g., from the internal dynamic state modeler 308). As a result, less drift is entered into the estimation by the noisy sensor signals. Thus, the process noise and measurement noise matrices Q and R define a weighting process within the EKF that either gives more credit to the state propagated by the internal dynamic model or the state determined by the measurements from the INS 210. Therefore, the noisier the sensor measurements are, the more relative weight may be assigned to the internal state propagation as more confidence may be placed in the predictions than in the measured values. For example, changing the weighting scheme for the measurement may include increasing or decreasing a covariance factor of the measurement in at least one of a process noise matrix Q or a measurement noise matrix R of the EKF.

In some examples, one or more relative or absolute augmentation aids may be implemented in combination with the AIDL aid 222 to increase the accuracy of the trajectory estimation. Relative augmentation aids include, for example, a dynamic model aid (e.g., which employs a dynamic aircraft performance model), a wind estimation aid, an optical flow aid (e.g., which calculates ground velocity of an aircraft based on camera images), stochastic trajectory prediction and/or redundant sensor configurations. Absolute augmentation aids include, for example, GPS vector tracking (e.g., tightly integrated inertial navigation), software defined radio (SDR) aids, cooperative navigation aids, Signal of Opportunity (SOP) navigation aids and/or terrain-based localization techniques (e.g., a digital terrain system (DTS), vision-based navigation, etc.).

While an example manner of implementing the navigation system 200 is illustrated in FIGS. 2 and 3, one or more of the elements, processes and/or devices illustrated in FIGS. 2 and 3 may be combined, divided, re-arranged, omitted, eliminated and/or implemented in any other way. Further, the example aircraft intent information 202, the example FCS 204, the example sensor(s) 206, the example GPS sensor 208, the example INS 210, the example sensors 212a-212n, the example navigation filter 214, the example AIDL aid 218, the example dynamic profile interpreter 300, the example dynamic activity level assignor 302, the example aircraft state mapper 304, the example weight modifier 306, the example internal dynamic state generator 308, the example measured state modeler 310 and/or, more generally, the example navigation system 200 of FIGS. 2 and 3 may be implemented by hardware, software, firmware and/or any combination of hardware, software and/or firmware. Thus, for example, any of the example aircraft intent information 202, the example FCS 204, the example sensor(s) 206, the example GPS sensor 208, the example INS 210, the example sensors 212a-212n, the example navigation filter 214, the example AIDL aid 218, the example dynamic profile interpreter 300, the example dynamic activity level assignor 302, the example aircraft state mapper 304, the example weight modifier 306, the example internal dynamic state generator 308, the example measured state modeler 310 and/or, more generally, the example navigation system 200 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example aircraft intent information 202, the example FCS 204, the example sensor(s) 206, the example GPS sensor 208, the example INS 210, the example sensors 212a-212n, the example navigation filter 214, the example AIDL aid 218, the example dynamic profile interpreter 300, the example dynamic activity level assignor 302, the example aircraft state mapper 304, the example weight modifier 306, the example internal dynamic state generator 308 and/or the example measured state modeler 310 is/are hereby expressly defined to include a tangible computer readable storage device or storage disk such as a memory, a digital versatile disk (DVD), a compact disk (CD), a Blu-ray disk, etc. storing the software and/or firmware. Further still, the example navigation system 200 of FIGS. 2 and 3 may include one or more elements, processes and/or devices in addition to, or instead of, those illustrated in FIGS. 2 and 3, and/or may include more than one of any or all of the illustrated elements, processes and devices.

Figure 4:
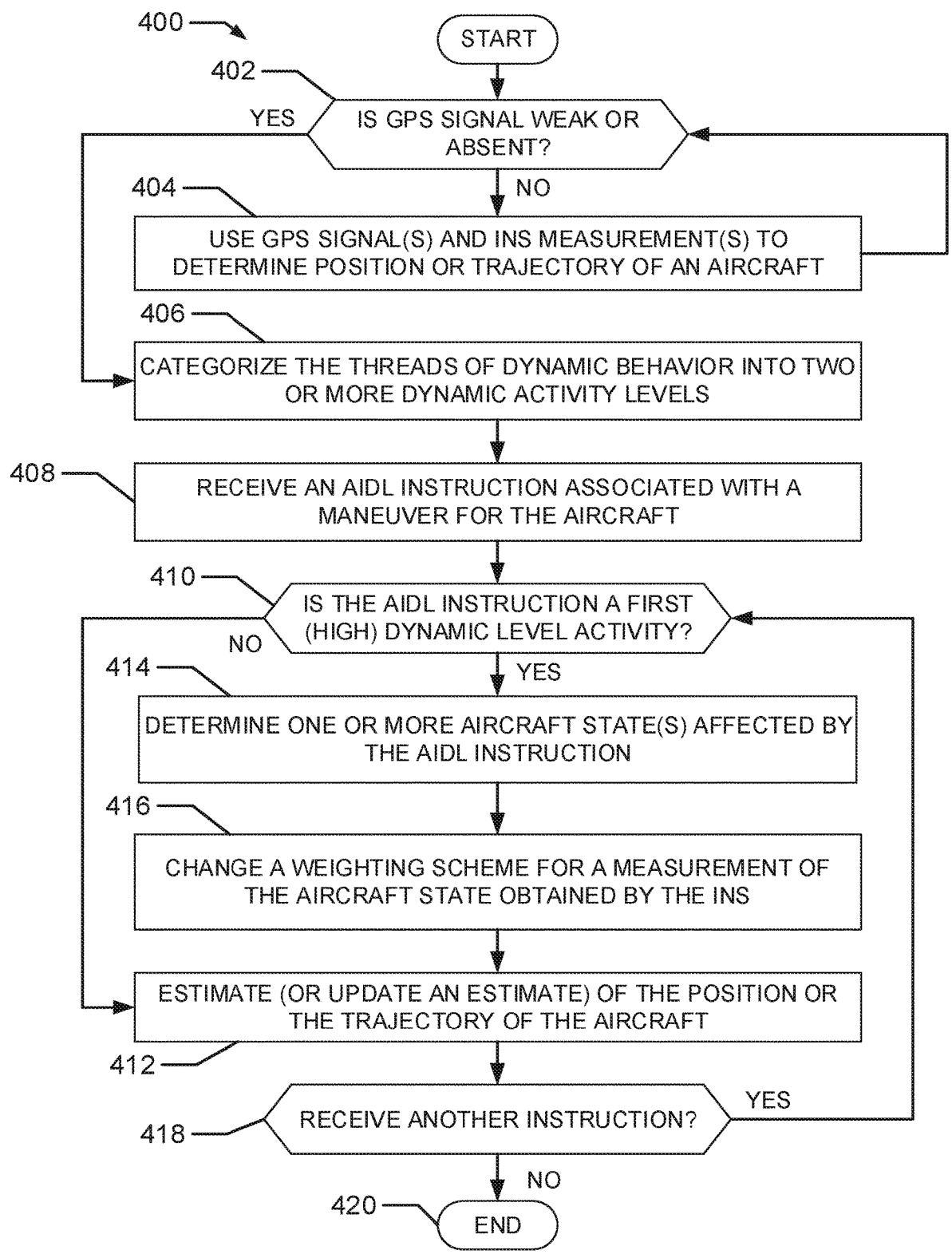
FIG. 4 is a flowchart representative of an example method for estimating or predicting a position or trajectory of a UAV in a GPS-denied environment and implemented by the example navigation system of FIG. 2.

A flowchart representative of example method for implementing the navigation system 200 of FIGS. 2 and 3 is shown in FIG. 4. In this example, the method may be implemented using machine readable instructions that comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example navigation system 200 may alternatively be used. For example, the order of execution of the blocks may be changed, and/or some of the blocks described may be changed, eliminated, or combined.

As mentioned above, the example method of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Turning in detail to the drawings, FIG. 4 is a flowchart illustrating an example method 400 to implement the example navigation system 200 of FIG. 2 to estimate a position (e.g., location) or a trajectory of an aircraft, such as the UAV 100 (FIG. 1). During normal navigation when absolute position information is available (e.g., from the GPS sensor), the navigation system 200 uses a combination of the measurements from the INS 210 and the absolute position information (e.g., from the GPS sensor 208) to determine the position or trajectory of the UAV 100. At block 402, the navigation system 200 determines whether the UAV 100 is in a GPS-denied environment by detecting the availability and/or strength of the GPS signal. In some examples, the determination is made by the navigation filter 214. If the navigation filter 214 determines GPS signal is available and sufficient, the navigation system 200 continues to operate as normal. In particular, at block 404, the navigation filter 214 uses the absolute PVT measurements from the GPS sensor 208 and the measurement(s) from the INS 210 to determine the trajectory of the UAV 100. The navigation system 200 then continues to monitor the presence and strength the GPS signals (block 402).

If the navigation filter 214 determines the UAV 100 is in a GPS-denied environment (at block 402), the AIDL aid 218 categorizes the three threads of dynamic behavior (longitudinal, lateral and propulsive motion) into two or more dynamic activity levels (e.g., high and low dynamic activity levels) (block 406). For example, a first (high) dynamic activity level for the longitudinal thread may be an increase in pitch greater than or equal to about 15°, and a second (low) dynamic activity level for the longitudinal thread may be an increase in pitch less than about 15°.

At block 408, the AIDL aid 218 receives an AIDL instruction from the aircraft intent information 202. The AIDL instruction is associated a maneuver (e.g., a longitudinal maneuver, a lateral maneuver, etc.) for the UAV 100. At block 410, the AIDL aid 218 determines if the AIDL instruction is associated with the first (high) dynamic activity level in one of the three threads of dynamic behavior. In some examples, the AIDL aid 218 compares the AIDL instruction and/or the corresponding maneuver to a threshold and determines whether the AIDL instruction and/or the corresponding maneuver meets the threshold. In some examples, if the AIDL instruction is not identified as the first (high) dynamic activity level (e.g., the AIDL instruction is associated with the second (low) dynamic activity level), the navigation filter 214 estimates the position or trajectory of the UAV 100 using the measurement(s) from the INS 210 without changing the weight of the measurement(s) (block 412). In other examples, if the AIDL instruction is associated with the second (low) dynamic activity level, the weight modifier 306 changes the weighting scheme to apply more weight to the state as measured by the INS 210. In some examples, multiple dynamic activity levels may be established, and each level may correspond to a different weight to be applied to the corresponding state.

If the AIDL instruction is identified as the first (high) dynamic activity level (e.g., a high dynamic activity), at block 414 the AIDL aid 218 maps the AIDL instruction to the one or more state(s) (or state vector(s)) that are affected by the AIDL instruction, namely, the aircraft states that are expected to experience a high dynamic activity level. Once the state(s) are identified, at block 416 the navigation filter 214 changes a weighting scheme (e.g., a weight) for a measurement of the aircraft state obtained by the INS 210. In some examples, the weighting scheme for the measurement is changed in response to the UAV 100 being in a GPS-denied environment. In some examples, changing the weighting scheme includes assigning a lower weight to the measurement obtained by the INS 210. For example, the process or measurement noise covariance factors may be decreased. Additionally or alternatively, in some examples more or less weight is assigned to the state as determined by the internal dynamic state modeler 308. For example, the measurement obtained by the INS 210 may be a first measurement, and a second measurement may be determined based on the internal dynamic model generated by the internal dynamic state modeler 308. In some such examples, changing the weighting scheme for the first measurement (e.g., the measurement obtained by the INS 210) includes assigning a higher weight to the second measurement (e.g., the measurement determined by the internal dynamic model). At block 412, the navigation filter 214 uses the modified or altered weighting scheme and the measurement to estimate (or update an estimate) of the position or the trajectory of the UAV 100. The navigation filter 214 estimates the position or trajectory (e.g., the OT 216) without an absolute position measurement. By decreasing the weight placed on the noisy state measurements, less error is introduced into the navigation model, thereby improving the accuracy of the position or trajectory estimation.

In some examples, the weighting scheme is changed in response to detection of noisy instantaneous measures of the dynamic behavior. For example, if noisy signals from the INS 210 are received by the navigation filter 214, the navigation filter 214 changes the weighting scheme to place less weight on the aircraft state(s) as measured by the INS 210.

At block 418, the navigation system 200 determines if another instruction is to be implemented by the UAV 100. If the aircraft has landed or the mission is complete, for example, the example method 400 ends (block 420). Otherwise, the AIDL aid 218 continues to identify whether the AIDL instructions are associated with high dynamic activity levels and the navigation filter 214 continues to modify the weighting scheme accordingly.

Figure 5:
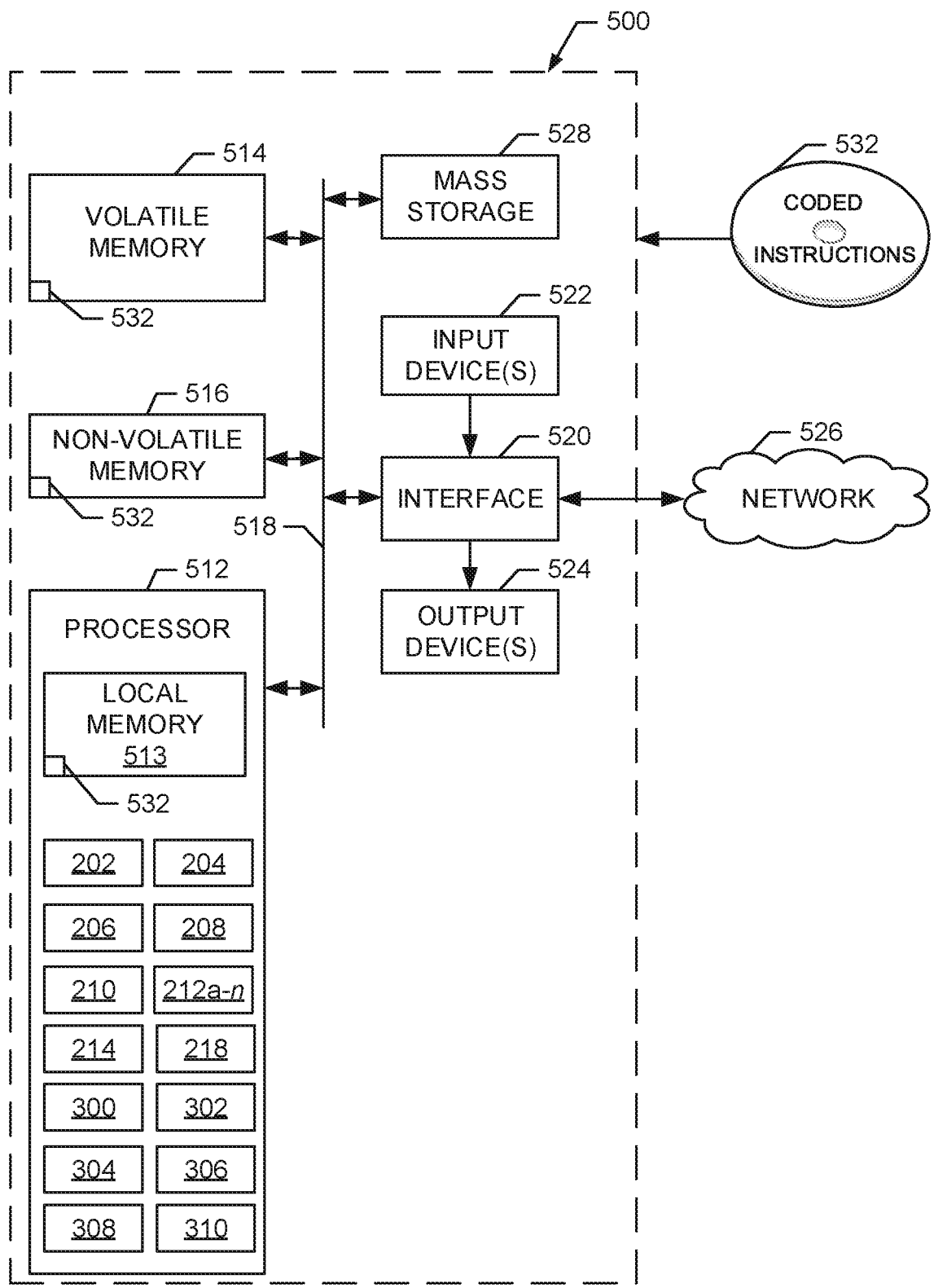
FIG. 5 is a block diagram of an example processor system structured to execute machine readable instructions to implement the method of FIG. 4 and the example navigation system of FIG. 2.

FIG. 5 is a block diagram of an example processor platform 500 capable of executing the instructions to implement the method 400 of FIG. 4 and the navigation system 200 of FIGS. 2 and 3. The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or any other type of computing device.

The processor platform 500 of the illustrated example includes a processor 512. The processor 512 of the illustrated example includes hardware that may implement one or more of the example aircraft intent information 202, the example FCS 204, the example sensor(s) 206, the example GPS sensor 208, the example INS 210, the example sensors 212a-212n, the example navigation filter 214, the example AIDL aid 218, the example dynamic profile interpreter 300, the example dynamic activity level assignor 302, the example aircraft state mapper 304, the example weight modifier 306, the example internal dynamic state generator 308 and/or the example measured state modeler 310. For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

Coded instructions 532 to implement the example method 400 of FIG. 4 may be stored in the mass storage device 528, in the volatile memory 514, in the non-volatile memory 516, and/or on a removable tangible computer readable storage medium such as a CD or DVD.

From the foregoing, it will be appreciated that the above disclosed methods, apparatus/systems and articles of manufacture improve predictions and reduce navigation system error in a UAS navigating a GPS-denied environment. Example navigation systems disclosed herein utilize the indicated dynamic behavior being pursued (e.g., based on the AIDL instruction(s)) and modify or change the underlying process model and/or measurement model covariance terms which, in effect, define the information fusion process. As a result, the disclosed navigation systems produce an observed trajectory that more clearly resembles the actual trajectory being flown by a UAS. This technique has been demonstrated to provide superior performance in uncertain settings such as the GPS-denied scenarios described herein. While the techniques disclosed herein are described in connection with a UAV, it is understood that the example techniques may similarly be implemented in any manned aircraft that also employs a navigation system with a navigation filter that estimates an aircraft location or trajectory.

Although certain example methods, apparatus/systems and articles of manufacture have been disclosed herein, the scope of coverage of this patent is not limited thereto. On the contrary, this patent covers all methods, apparatus/systems and articles of manufacture fairly falling within the scope of the claims of this patent.

What is claimed is:

1. An aircraft comprising:
an inertial navigation system (INS) to obtain a measurement of an aircraft state;
an aircraft intent description language (AIDL) aid to identify an AIDL instruction of an aircraft as associated with a dynamic activity level, the aircraft state affected by the AIDL instruction;
a navigation filter to:
change a weighting scheme for the measurement of the aircraft state; and
estimate a location of the aircraft based on the weighting scheme and the measurement; and
a flight control system to calculate and execute flight control commands to fly the aircraft based on the estimated location and the AIDL instruction.

2. The aircraft of claim 1, wherein the navigation filter is to change the weighting scheme for the measurement by assigning a lower weight to the measurement if the dynamic activity level is a high dynamic activity level.

3. The aircraft of claim 1, wherein the measurement is a first measurement, and wherein the navigation filter is to generate an internal dynamic model of the aircraft and determine a second measurement for the aircraft state based on the internal dynamic model.

4. The aircraft of claim 3, wherein the navigation filter is to change the weighting scheme for the first measurement by assigning a higher weight to the second measurement.

5. The aircraft of claim 1, wherein the navigation filter includes an Extended Kalman Filter (EKF), and wherein the EKF is to increase or decrease a covariance factor of the measurement in at least one of a process noise matrix Q or a measurement noise matrix R of the EKF.

6. The aircraft of claim 1, wherein the navigation filter is to determine when the aircraft is in a GPS-denied environment.

7. The aircraft of claim 6, wherein the navigation filter is to change the weighting scheme for the measurement in response to the aircraft being in the GPS-denied environment.

8. The aircraft of claim 1, wherein the navigation filter estimates the location of the aircraft without an absolute position measurement.

9. The aircraft of claim 1, wherein the INS includes at least one of an accelerometer, a gyroscope, a magnetometer, a static pressure sensor, a dynamic pressure sensor, or a temperature sensor.

10. A tangible computer readable storage medium comprising instructions that, when executed, cause a machine to at least:
identify an aircraft intent description language (AIDL) instruction as associated with a high dynamic activity;
determine an aircraft state to be affected by the AIDL instruction;
change a weighting scheme for a measurement of the aircraft state obtained by an inertial navigation system (INS) of an aircraft;
estimate a trajectory of the aircraft based on the weighting scheme and the measurement; and
calculate and execute flight control commands to fly the aircraft based on the estimated trajectory and the AIDL instruction.

11. The tangible computer readable storage medium of claim 10, wherein the instructions, when executed, cause the machine to change the weighting scheme for the measurement by assigning a lower weight to the measurement.

12. The tangible computer readable storage medium of claim 10, wherein the measurement is a first measurement, the instructions further to cause the machine to:
generate an internal dynamic model of the aircraft; and
determine a second measurement for the aircraft state based on the internal dynamic model.

13. The tangible computer readable storage medium of claim 12, wherein the instructions, when executed, cause the machine to change the weighting scheme for the first measurement by assigning a higher weight to the second measurement.

14. The tangible computer readable storage medium of claim 10, wherein the instructions, when executed, are to identify the AIDL instruction as the high dynamic activity by:
comparing a maneuver associated with the AIDL instruction to a threshold; and
identifying the AIDL instruction as the high dynamic activity based on the comparison.

15. The tangible computer readable storage medium of claim 10, wherein the instructions, when executed, cause the machine to determine when the aircraft is in a GPS-denied environment.

16. The tangible computer readable storage medium of claim 15, wherein the instructions, when executed, cause the machine to change the weighting scheme for the measurement in response to the aircraft being in the GPS-denied environment.

17. The tangible computer readable storage medium of claim 10, wherein the instructions, when executed, cause the machine to estimate the trajectory of the aircraft without an absolute position measurement.

18. The tangible computer readable storage medium of claim 10, wherein the aircraft is an unmanned aerial vehicle (UAV).

19. The aircraft of claim 1, wherein the dynamic activity level is a first dynamic activity level of a plurality of dynamic activity levels associated with a high dynamic activity level, the plurality of dynamic activity levels including a second dynamic activity level associated with a low dynamic activity.

20. The aircraft of claim 1, wherein the aircraft is an unmanned aerial vehicle.

\* \* \* \* \*